(12) United States Patent
Kimura et al.

(10) Patent No.: US 8,838,265 B2
(45) Date of Patent: Sep. 16, 2014

(54) MACHINE TOOL, MACHINING METHOD, PROGRAM AND NC DATA GENERATION DEVICE

(75) Inventors: Akira Kimura, Yamatokoriyama (JP); Katsuhiko Ono, Yamatokoriyama (JP)

(73) Assignee: Mori Seiki & Co., Ltd., Nara (JP)

( * ) Notice: Subject to any disclaimer, the term of this patent is extended or adjusted under 35 U.S.C. 154(b) by 511 days.

(21) Appl. No.: 13/332,267

(22) Filed: Dec. 20, 2011

(65) Prior Publication Data

US 2012/0197424 A1    Aug. 2, 2012

(30) Foreign Application Priority Data

Jan. 28, 2011    (JP) ................................ P2011-016818

(51) Int. Cl.
| | | |
|---|---|---|
| *G06F 19/00* | (2011.01) | |
| *G05B 13/00* | (2006.01) | |
| *B25J 9/16* | (2006.01) | |
| *G05B 19/18* | (2006.01) | |
| *G05B 19/25* | (2006.01) | |
| *G05B 19/23* | (2006.01) | |

(52) U.S. Cl.
CPC .... *G05B 19/184* (2013.01); *G05B 2219/50355* (2013.01); *G05B 2219/50353* (2013.01); *G05B 2219/35128* (2013.01)
USPC ........... 700/176; 700/187; 700/189; 700/191; 700/193; 318/561; 318/568.1; 318/573; 318/574

(58) Field of Classification Search
CPC ........... G05B 19/182; G05B 19/40938; G05B 19/41; G05B 2219/34215; G05B 2219/35426; G05B 2219/50289; B23H 7/18; B23H 7/26
USPC ......... 700/159, 174–176, 186, 187, 189–194; 318/560, 561, 567, 568.1, 569, 570, 318/573, 574
See application file for complete search history.

(56) References Cited

U.S. PATENT DOCUMENTS

| | | | | |
|---|---|---|---|---|
| 4,061,953 | A * | 12/1977 | Matsumoto | ................... 318/573 |
| 4,445,182 | A * | 4/1984 | Morita et al. | ................. 700/183 |
| 6,339,203 | B1 * | 1/2002 | Nakamura et al. | ........... 219/69.2 |
| 7,012,395 | B2 * | 3/2006 | Haunerdinger et al. | ...... 318/573 |
| 7,853,351 | B2 * | 12/2010 | Corey | ........................... 700/193 |

* cited by examiner

*Primary Examiner* — Crystal J Barnes-Bullock
(74) *Attorney, Agent, or Firm* — Haverstock & Owens LLP

(57) ABSTRACT

A work having a non-circular cross-section is machined by relative movement between the work and a tool, as the relative position and angle between the work and tool are changed at least within a plane including the cross-section of the work. In machining along a preset tool path, the difference between the relative angle at a point on the preset tool path which machining is started and that point on the preset tool path at which machining is finished is calculated. Time needed in machining along the preset tool path is equally divided by a preset number at equal time divisions, and positions on the tool path corresponding to equal time divisions are set as tool path points. When the tool moves through each point, the relative angle is continuously changed an angle corresponding to division of the difference of the relative angles by the preset number of equal time divisions.

4 Claims, 11 Drawing Sheets

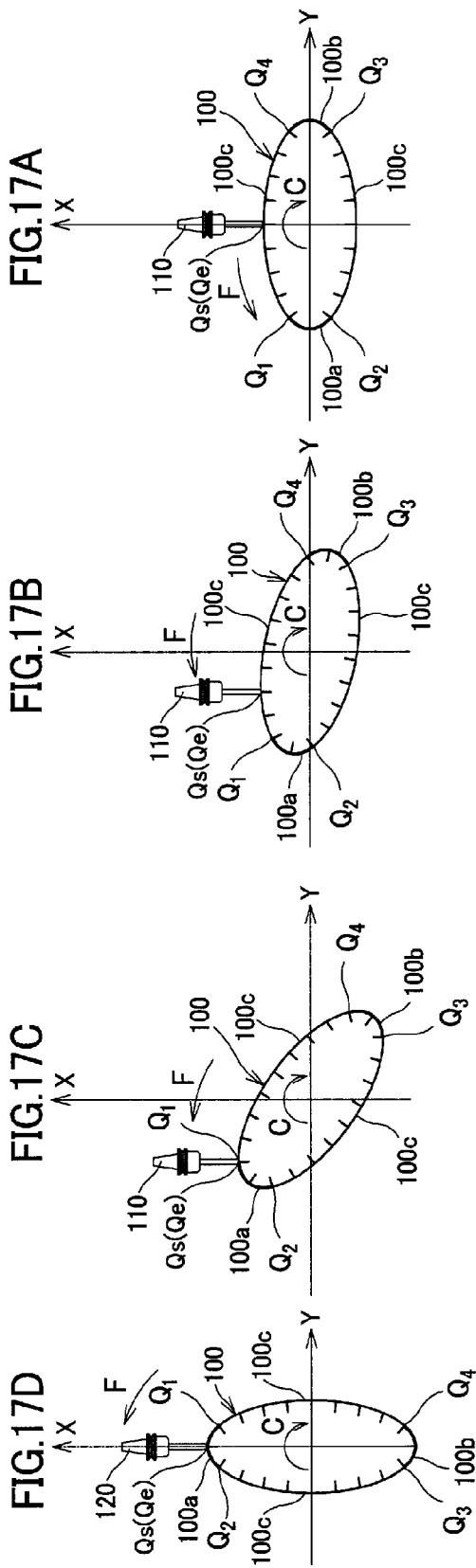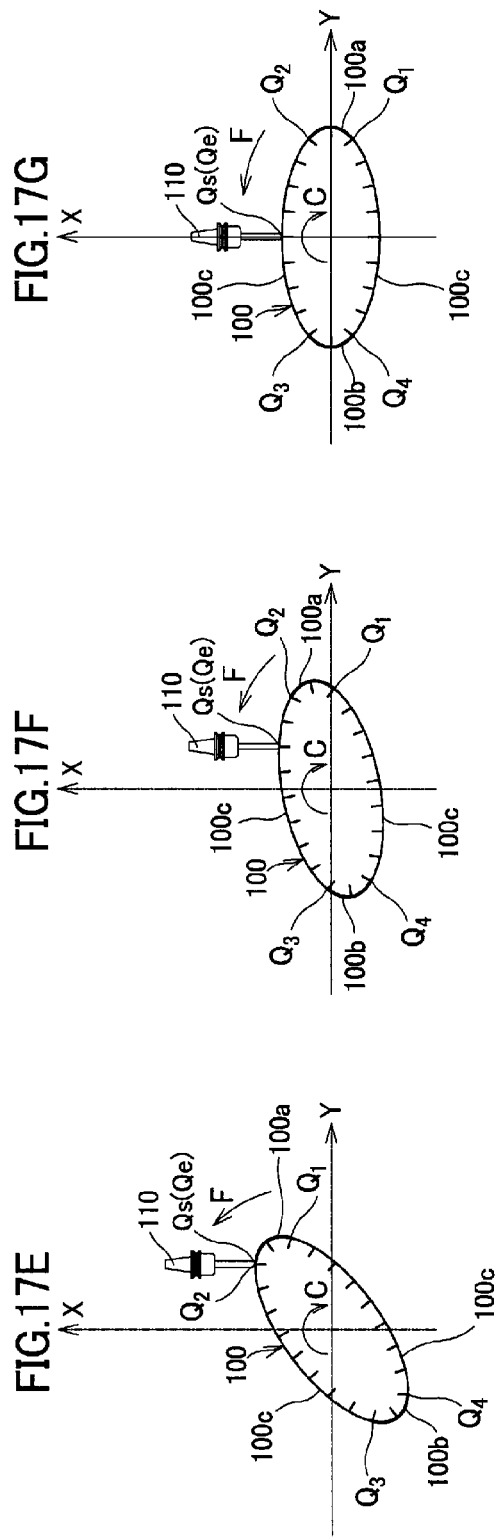

MACHINE TOOL, MACHINING METHOD, PROGRAM AND NC DATA GENERATION DEVICE

BACKGROUND OF THE INVENTION

1. Field of the Invention

This invention relates to a machine tool which carries out machining based on relative movement between a work and a tool as the relative position and the relative angle between the work and the tool are changed in a plane including at least a work's non-circular cross-section. The invention also relates to a method for machining, a program and an NC data generation device.

2. Description of Related Art

In these days, in the field of machining of mechanical parts or metal materials, a 5-axis controlled machine tool, as shown in Patent Document 1, is in use. This 5-axis controlled machine tool has three linear axes, namely an X axis, a Y axis and a Z axis, extending perpendicular to one another, and two rotational axes about two linear axes selected from the above mentioned three linear axes. The three linear axes and the two rotational axes may be controlled simultaneously. Such 5-axis controlled machine tool may roughly be classified into two types, namely a 5-axis controlled machining center comprised of a conventional machining center added by two rotational axes, and a 5-axis controlled complex machining device. This 5-axis controlled complex machining device is an NC lathe on which a main spindle capable of a milling operation is mounted for performing a swinging movement. In each of these two machine tool types, a turning operation and a milling operation may be performed on a single machine tool. In addition, in the 5-axis controlled machine tool, even if a work is of a non-circular cross-section and complex in shape, such as a turbine blade or a fan blade for an aircraft jet engine, may be machined as the tool is tilted with respect to the work to change the tool position (tool orientation). Such turbine blade or fan blade is referred to below as a blade.

In view of complex movements performed by the above mentioned 5-axis controlled machine tool, the machining program for the 5-axis controlled machine tool is generated in general by a computer aided manufacturing device, referred to below as a CAM device. Such CAM device includes a tool foremost point control function which is in play at the time of concurrent 5-axis machining in which the linear axes and the rotational axes of the machine tool are driven simultaneously. Specifically, the tool foremost point control function operates not only to change the tool orientation but also correct for the tool length with changes in tool orientation in order to exercise control to cause the foremost part (tip) of the tool member to travel along a command tool path at a command speed. In giving a driving command at the time of concurrent 5-axis machining by such tool foremost point control, the tool orientation is crucial.

For example, in machining e.g., a blade with its complex shape, it is necessary to continuously change the tool orientation in order to prevent the tool member from conflicting against portions of the work other than the work points being cut or against component members of the 5-axis controlled machine tool. Moreover, if, in case of machining with a tool member, such as a bail end mill, an axial line of the tool member, referred to below as a tool axis, is coincident with a normal line drawn to the work surface, the cutting speed may not be increased at the foremost part of the tool. As a consequence, machining carried out may not be optimum. Thus, to cut a work with a tool member, such as a ball end mill, it is necessary to get the tool member tilted with respect to the line normal to the work surface in order to provide for improved surface properties of the finished product. That is, in giving a command by tool foremost point control in concurrent 5-axis machining, tool orientation control becomes crucial, and hence a method for setting the tool orientation becomes crucial.

In a CAM software 'ESPRIT' by DP TECHNOLOGY, four methods are shown as the methods for setting the tool orientation in a 5-axis controlled machine tool. One of these is a 'surface square or angular' method, in which the tool member is set at right angles to the work surface, with the tool axis coinciding with a line normal to the work surface, or at an angle inclined a preset angle with respect to the line normal to the work surface. The second one is 'a point traversing' method, in which the tool axis is aligned with a straight line interconnecting a specified point and the foremost part of the tool member, with the tool member being directed to the specified point. The third one is a 'fixed vector' method in which the tool member is oriented so that the tool axis is at a fixed angle irrespectively of the shape of the surface being machined. The last or fourth method is a 'profiling' method, in which the tool member is oriented so that the tool axis is aligned with a straight line interconnecting a specified curve and the foremost part of the tool member over a shortest distance.

However, if the tool orientation is set using the above mentioned four setting methods, the following problems may arise in manufacturing a blade with a non-circular cross-section by machining. For example, if the tool orientation is set using the 'surface square or angular' method, there is produced an area where the tool orientation is rapidly varied in machining the work with a non-circular cross-section because the tool member is set at right angles to or at an angle with respect to the work surface. In such area, the tool member needs to be moved at a speed (or acceleration) several times as high as that in the remaining area. It is not possible to drive the tool member at such driving speed, depending on the driving capability of a driving unit of the 5-axis controlled machine tool that drives the tool member. There is thus a risk that the cutting speed becomes lower than that in the remaining area such that it is not possible to maintain a constant cutting feed rate.

More specifically, the case of producing a blade with an elliptical cross-section 100 by machining will be explained with reference to FIG. 16. In this case, the orientation of a tool member 110 is rapidly changed along the long axis 120 in a first area 100a (an area from $Q_1$ to $Q_2$ in FIG. 16) and in a second area 100b (an area from $Q_3$ to $Q_4$ in FIG. 16) than in a remaining area 100c on the tool path along which the foremost part of the tool member 110 moves. That is, referring to FIGS. 17(A) to (C) and 17(E) to (G), the driving unit of the 5-axis controlled machine tool is able to drive the blade 100 in rotation in the C-direction, as well as to drive the tool member 110 along the feed direction F, in the remaining area 100c. The tool member 110 may be set at a surface square position on the surface of the blade 100 for cutting at a command feed rate for cutting.

However, if the driving unit of the 5-axis controlled machine tool attempts to set the tool member 110 in the first area 100a at a surface square position with respect to the surface of the blade 100, at a command feed rate for cutting, as shown in FIGS. 17(C) to 17(E), the driving unit is unable to drive the tool member because the orientation of the tool member 110 is varied rapidly in the first area. Hence, the cutting feed rate is lower than that in the remaining area 100c, with the result that a constant cutting feed rate may not be realized.

In similar trimmer, the orientation of the tool member 110 is rapidly varied in the second area 100b as well, and hence the driving unit of the 5-axis controlled machine tool is unable to drive the tool member 110 at the command cutting feed rate. That is, the cutting feed rate is lower than that in the remaining area 100c, with the result that the cutting feed rate may not be maintained constant.

In addition, if the method for tool orientation other than the 'surface square or angular' method is used to set the tool orientation, there is similarly produced an area where the tool is driven at a speed (or acceleration) several times faster than that in the remaining area. There is thus a risk that the cutting feed rate is lower in such area, with the result that it is not possible to maintain a constant cutting feed rate.

Furthermore, as shown in FIG. 16, in preparing the blade 100 by machining, continuous machining is not possible unless the orientation of the tool member 110 at a machining start point $Q_s$ on the tool path is coincident with that at a machining end point $Q_e$ at which the machining comes to an end after revolution of the blade 100 through 360°. However, if the method for tool orientation other than the 'surface square or angular' method is used, there is fear that the tool orientation of the tool member 110 at the start point $Q_s$ differs from that at the end point $Q_e$ after revolution of the blade 100 through 360°. As a result, the blade 100 may not be prepared by continuous machining.

There is thus a demand for a tool orientation setting method different from the above mentioned four methods. With this tool orientation setting method, different from the above mentioned four methods, it is necessary to provide for uniform changes in the tool orientation and for a constant angular velocity of tool tilting attendant on changes in tool orientation, in order that no load exceeding the driving capability of the 5-axis controlled machine tool will be imposed on the 5-axis controlled machine tool. In addition, the cutting feed rate from the start point $Q_s$ up to the end point $Q_e$ of machining on the tool path needs to be kept constant. Furthermore, the orientation of the tool member 110 needs to be the same at the end point $Q_e$ as at the start point $Q_s$ even after revolution of the blade 100 through 360°.

RELATED TECHNICAL DOCUMENT

Patent Document

[Patent Document 1] Japanese Laid-Open Patent Publication 2006-289511

SUMMARY OF THE INVENTION

Problem to be Solved by the Invention

In view of the above mentioned status of the related art, it is an object of the present invention to provide a machine tool, a machining method, a program and an NC data generation device, according to which machining is carried out by relative movement between a work of a non-circular cross-section and a tool, as the relative positions and the relative angles between the work and the tool are changed in a plane at least including the work's cross-section. With the machine tool, a machining method, a program and an NC data generation device, according to the present invention, it is necessary that changes in the tool orientation are uniform, and that the angular velocity of the tilting of the tool with respect to the work is constant. It is also necessary to maintain the cutting feed rate constant and to reduce the machining time as well as to improve surface properties of a finished product.

Means to Solve the Problem

To fulfill the above task, there is provided, according to the present invention, a machine tool for machining a work having a non-circular cross-section by relative movement between the work and a tool, as the relative position and the relative angle between the work and the tool are changed at least within a plane including the cross-section of the work. In machining the work along a preset tool path on the work with the tool, the difference between the relative angle between the work and the tool at a point on the preset tool path at which the machining by the tool is started and that between the work and the tool at another point at which the machining is finished is calculated. The time needed in the machining along the preset tool path is equally divided by a preset number to give the preset number of equal time divisions, and positions on the tool path corresponding to the equal time divisions are set as equal time division tool path points. At this time, the equal time divisions on the time axis are assigned or plotted onto the entire length of the tool path to yield the equal time division tool path points as a variety of factors, including the variable relative ease in machining along the tool path or the shape and/or material types of the work, are taken into account. When the tool travels through each of the equal time division tool path points on the tool path corresponding to the equal time divisions, the relative angle between the tool and the work is continuously changed an angle corresponding to division of the difference of the relative angle by the above mentioned preset number. Such machine tool includes a work setting member that rotationally drives a work set thereon, a tool that cuts a preset site of the work, and a controller that controls the operation of the work setting member and the tool. The controller takes charge of the above processing.

There is also provided, according to the present invention, a method for machining a work having a non-circular cross-section by relative movement between a work and a tool, as the relative position and the relative angle between the work and the tool are changed at least within a plane including the non-circular cross-section of the work. The method includes calculating, in machining the work along a preset tool path on the work with the tool, the difference between the relative angle between the work and the tool at a point on the preset tool path at which the machining by the tool is started and that between the work and the tool at another point on the preset tool path at which the machining is finished. The method also includes equally dividing the time needed in the machining along the preset tool path by a preset number to give the preset number of equal time divisions, and setting positions on the tool path corresponding to the equal time divisions as equal time division tool path points. At this time, the equal time divisions on the time axis are assigned or plotted onto the entire length of the tool path to yield the equal time division tool path points as a variety of factors, including the variable relative ease in machining along the tool path or the shape and/or material types of the work, are taken into account. The method also includes continuously changing, when the tool travels through each of the equal time division tool path points on the tool path corresponding to the equal time divisions, the relative angle between the tool and the work an angle corresponding to division of the difference of the relative angles by the above mentioned preset number.

There is further provided, according to the present invention, a program for allowing a computer to execute a method for machining a work having a non-circular cross-section by relative movement between a work and a tool, as the relative position and the relative angle between the work and the tool are changed at least within a plane including the cross-section of the work. The method comprises calculating, in machining the work along a preset tool path on the work with the tool, the difference between the relative angle between the work and the tool at a point on the preset tool path at which the machining by the tool is started and that between the work and the tool at another point on the preset tool path at which the machining is finished. The method also includes equally dividing the time needed in the machining along the preset tool path by a preset number to give the preset number of equal time divisions, and setting positions on the tool path corresponding to the equal time divisions as equal time division tool path points. At this time, the equal time divisions on the time axis are assigned or plotted onto the entire length of the tool path to yield the equal time division tool path points as a variety of factors, including the variable relative ease in machining along the tool path or the shape and/or material types of the work, are taken into account. The method also includes continuously changing, when the tool travels through each of the equal time division tool path points on the tool path corresponding to the equal time divisions, the relative angle between the tool and the work an angle corresponding to division of the difference of the relative angles by the above mentioned preset number.

There is further provided, according to the present invention, an NC data generation device that generates NC data that control a machine tool. The machine tool performs machining on a work with a non-circular cross-section, by relative movement between the work and a tool, as the relative position and the relative angle between the work and the tool are changed at least in a plane including the work's cross-section. Moreover, in machining the work along a preset tool path on the work with the tool, the NC data generation device calculates the difference between the relative angle between the work and the tool at a point on the preset tool path at which the machining by the tool is started and that between the work and the tool at a point on the preset tool path at which the machining is completed. The NC data generation device also equally divides the time needed in the machining along the preset tool path to give the above mentioned preset number of equal time divisions and positions on the tool path corresponding to the equal time divisions are set as equal time division tool path points. At this time, the equal time divisions on the time axis are assigned or plotted onto the entire length of the tool path to yield the equal time division tool path points a variety of factors, including the variable relative ease in machining along the tool path or the shape and/or material types of the work, are taken into account. When the tool travels through each of the equal time division tool path points on the tool path corresponding to the equal time divisions, the relative angle between the tool and the work is continuously changed an angle corresponding to division of the difference of the relative angles by the above mentioned preset number.

Beneficent Effects of the Invention

According to the machine tool of the present invention, in machining the work along a preset tool path on the work with a tool, the difference between the relative angle between the work and the tool at a point on the preset tool path at which the machining by the tool is started and that between the work and the tool at a point on the preset tool path at which the machining is finished is calculated. The time needed in the machining along the preset tool path is equally divided by a preset number to give the above mentioned preset number of equal time divisions, and positions on the tool path corresponding to the equal time divisions are set as equal time division tool path points. When the tool travels through each of the equal time division tool path points on the tool path corresponding to the equal time divisions, the relative angle between the tool and the work is continuously changed an angle corresponding to division of the difference of the relative angles by the above mentioned preset number.

BRIEF DESCRIPTION OF THE DRAWINGS

FIG. 17 is a cross-sectional view showing the tool orientation of the tool from a start point to an end point when the tool orientation is set using the 'surface square or angular' method.

DESCRIPTION OF THE PREFERRED EMBODIMENTS

A machine tool according to the present invention will now be described in detail with reference to the drawings. Here, a complex machining device, as a machine tool according to the present invention, in which a main spindle capable of a milling operation is mounted for rotation on an NC lathe to allow for 5-axis simultaneous machining, is taken up for explanation. It is observed that, in the context of the present specification, forward/backward and left/right mean the forward/backward and left/right, respectively, as seen from the front side of the machine.

Figure 1:
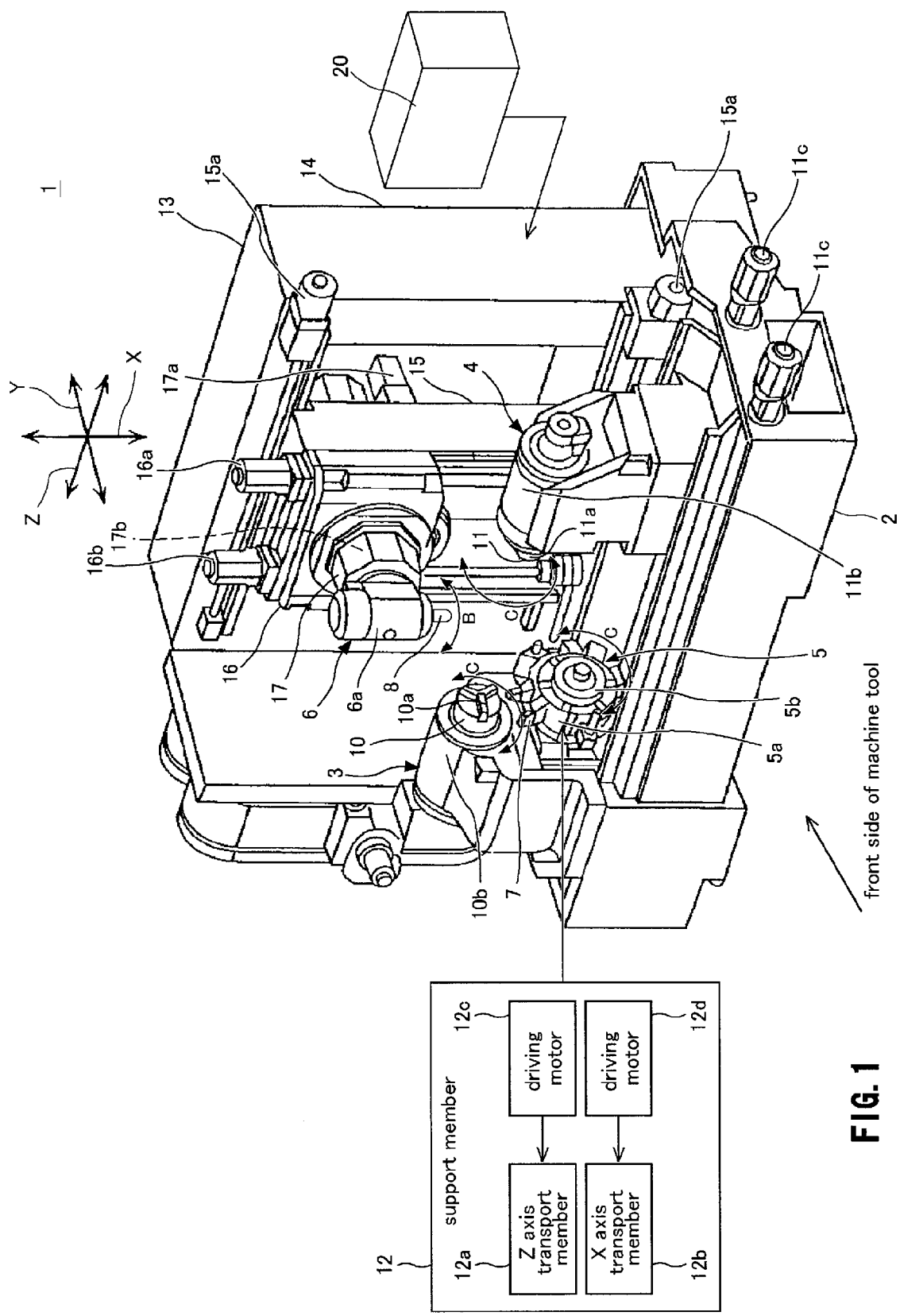
FIG. 1 is a perspective view of a machine tool according to the present invention.

Referring to FIG. 1, the complex machining device 1 according to the present invention includes a bed 2, a first headstock 3, a second headstock 4, a tool rest 5, a third main spindle 6 and a controller 20, when looking from the front side of the machine as indicated in FIG. 1. The first headstock is mounted on the bed 2, and the second headstock is mounted on the bed 2 coaxially with the first headstock 3 for movement along the Z axis, that is, in the left/right direction. The tool rest 5 is mounted between the first and second headstocks 3, 4 on the bed 2 for movement along the X axis, that is, in an upward/downward direction, and along the Z axis direction. The third main spindle 6 is mounted on the bed 2 for movement along the X axis, along the Y axis, that is, in the forward/backward direction, and along the Z axis. The controller 20 controls the complex machining device 1 in its entirety.

Referring to FIG. 1, a first main spindle 10 and a second main spindle 11, facing each other, are mounted on the first headstock 3 and on the second headstock 4, respectively. The first main spindle 10 is provided on its front side with a chuck 10a to grab a work, whilst the second main spindle 11 is also provided on its front side with a chuck 11a to grab the work. The first and second main spindles are driven in rotation by driving motors 10b, 11b in a C-direction about the Z axis, such as to cause rotation of the work mounted in position. The second headstock 4 is supported by a guide rail, not shown, mounted on the bed 2 in parallel with the Z axis, and is driven along the Z axis as a ball screw threaded therewith is run in rotation by a driving motor 11c.

The tool rest 5 includes a turret 5a on an outer rim of which a larger number of turning tools 7 are mounted at preset distances from one another. Those tools that are to be used are revolved on indexing to preset machining sites for positioning and are clamped at the machining sites. The turret 5a is driven in rotation in the C-direction about the Z axis by a driving motor 5b. The tool rest 5 is driven by a support member 12 along the X axis direction and along the Z axis direction.

The support member 12 includes a Z axis transport member 12a, carried on the bed 2 for movement along the Z axis direction, and an X axis transport member 12b, carried on the Z axis transport member 12a for movement along the X axis direction. For example, the Z axis transport member 12a is carried on the bed 2 for movement along the Z axis direction by a guide rail, not shown, arranged on the bed in parallel with the Z axis, and is in mesh with a ball screw, not shown. The Z axis transport member is driven along the Z axis direction by the ball screw run in rotation by a driving motor 12c. The X axis transport member 12b is carried for movement along the X axis direction by another guide rail, arranged on the Z axis transport member 12a in parallel with the X axis, and is in mesh with a ball screw, not shown. The X axis transport member is driven along the X axis direction by the ball screw that is in meshing therewith and that is driven in rotation by a driving motor 12d.

The third main spindle 6 carries a milling tool (tool member) 8 so that the tool axis of the tool member 8 will extend at right angles to the Y axis. The third main spindle 6 is run in rotation by a driving motor 6a. The third main spindle 6 is also driven by a main spindle support mechanism 13 along the X axis direction, along the Y axis direction and along the Z axis direction, while also being rotationally driven in the B-direction about the Y axis, such as to perform so-called B-axis machining.

The main spindle support mechanism 13 includes a column 14, fastened to the bed 2, and a saddle 15, carried by the column 14 for movement along the Z axis direction. The main spindle support mechanism also includes a cross-slide 16, carried by the saddle 15 for movement along the X axis direction, and a ram 17, carried on the cross-slide 16 for movement along the Y axis direction. The ram carries the third main spindle 6 for rotation in the B-direction, that is, about the Y axis.

The saddle 15 is carried by a further guide rail, arranged on the column 14 in parallel with the Z axis, for movement along the Z axis, and is engaged with a ball screw, not shown. The saddle is driven along the Z axis direction by the ball screw that meshes therewith and that is run in rotation by a driving motor 15a. The cross-slide 16 is carried by a further guide rail, not shown, arranged on the saddle 15 in parallel with the X axis, for movement along the X axis, and is in mesh with a ball screw, not shown. The cross-slide may thus be driven along the X axis direction by the ball screw driven in rotation by a driving motor 16a. The ram 17 is carried by a further guide rail, not shown, mounted on the cross-slide 16 in parallel with the Y axis, for movement along the Y axis, and is in mesh with a ball screw, not shown. Hence, the ram is driven along the Y axis direction by the ball screw being run in rotation by a driving motor 17a. In addition, a motive power transmitting member, such as a worm gear, not shown, mounted on the third main spindle 6, is run in rotation by a driving motor 17b, whereby the third main spindle 6 is run in rotation in the B-direction, that is, about the Y axis.

Figure 2:
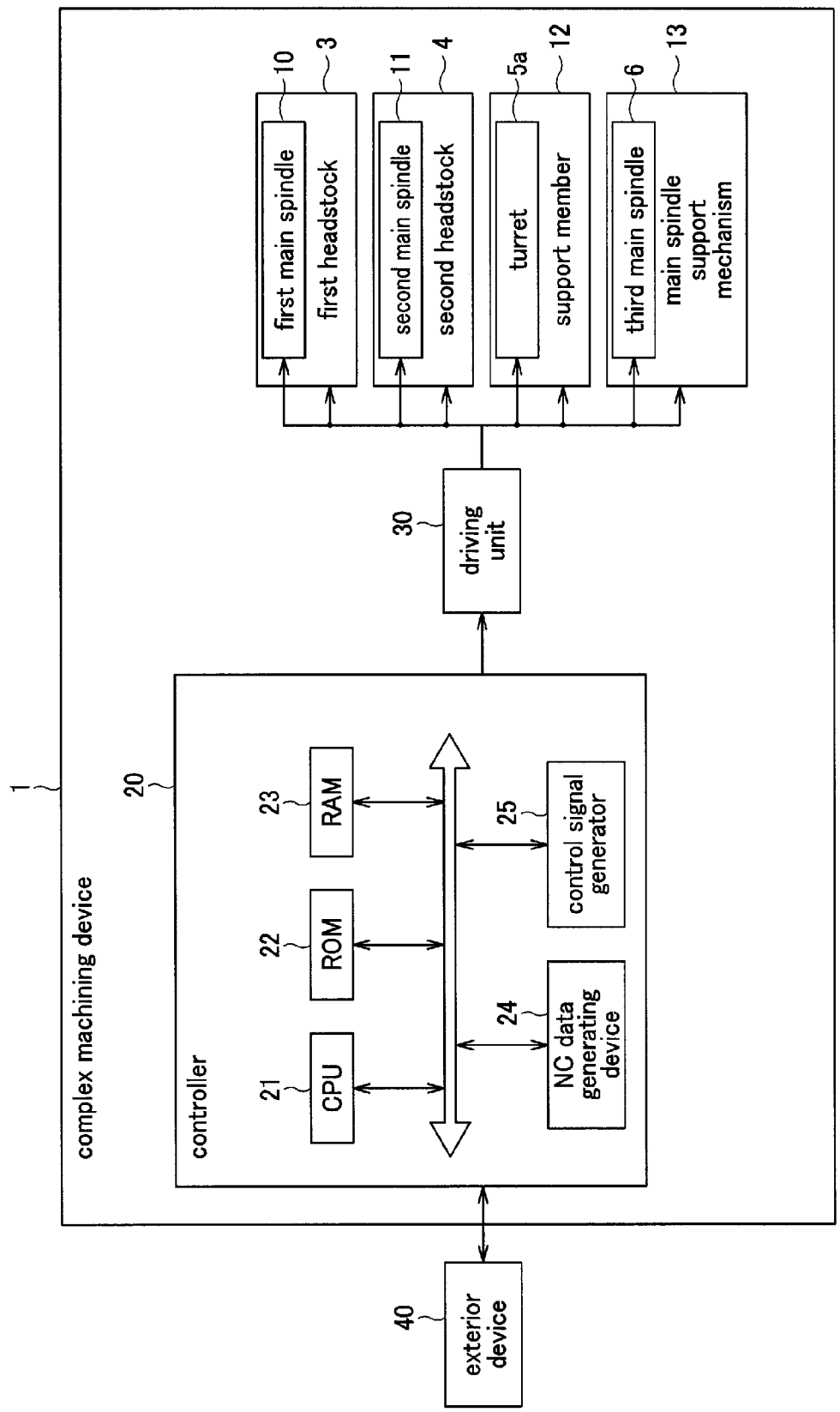
FIG. 2 is a block diagram of the machine tool according to the present invention.

Referring to FIG. 2, the controller 20 controls the driving of a driving motor 10b of the first main spindle 10, the driving motor 11b of the second main spindle 11, driving motor 11c of the second headstock 4, driving motor 5b of the turret 5a, the driving motor 12c of the Z axis transport member 12a, driving motor 12d of the X axis transport member 12b, driving motor 6a of the third main spindle 6, driving motor 15a of the saddle 15, driving motor 16a of the cross-slide 16 and the driving motors 17a, 17b of the ram 17. These driving motors are collectively referred to below as a driving unit 30. The controller thus controls the overall operation of the complex machining device 1.

Specifically, the controller 20 is a computer made up mainly of a CPU 21, a ROM 22 and a RAM 23. A control program, controlling the operation in its entirety, is read from the ROM 22 into the RAM 23 in which it is transiently stored. The CPU 21 performs preset calculations in accordance with the control program to control the entire operation of the complex machining device 1.

The controller 20 includes an NC data generating unit 24 that operates as a CAM device, and a control signal generator 25 that generates a control signal to drive the driving unit 30 based on NC data generated by the NC data generating unit 24.

The NC data generating unit 24 of the controller 20 operates as a computer aided design device, referred to below as CAD device. On receiving shape data and machining condition data from an exterior device 40, which is distinct and separate from the complex machining device 1, the NC data generating device generates NC data including data contents for a site machined on the work, based on the shape data and the machining condition data. These data contents include paths of tool member movements, feed rate for cutting with which the foremost part of the tool member travels along the tool paths, and tool orientation with which the tool member travels along the tool path at the feed rate for cutting.

The shape data, entered to the NC data generating unit 24, are generated by the exterior device 40, and may, for example, be the ultimate shape or size of the work, accuracy with which the surface being machined is finished, material type of the work following the machining, and the shape of the work before machining. The machining condition data, entered to the NC data generating unit 24, may, for example, be tool types, cutting rate as set for each tool sort depending on the tool diameters or the material types, amount of the material removed per rotational movement, and the tolerances. The controller 20 may further include a machining condition data memory constituted by, for example, a hard disc that memorizes the machining condition data from the outset.

In setting the tool orientation, the NC data generating unit 24 sets it such as to avoid a tool conflicting against work points other than the work point being machined, or against constituent portions of the complex machining device 1. The NC data generating unit 24 also sets the tool orientation using the 'surface square or angular' method, 'point traversing' method, 'fixed vector' method or the 'profiling' method. In the 'surface square or angular' method, the tool member is set at right angles to the work surface, with the tool axis coinciding with a line normal to the work surface, or at an angle inclined a preset angle to the line normal to the work surface. In the 'point traversing' method, the tool axis is aligned with a straight line interconnecting a specified point and the foremost tool part, and the tool member is directed to the specified point. In the 'fixed vector' method, the tool is oriented so that the tool axis is at a fixed angle in irrespectively of the shape of the surface being cut. In the 'profiling' method, the tool member is oriented so that the tool axis is aligned with a straight line interconnecting a specified curve and the foremost part of the tool member over a shortest distance.

In setting the tool orientation, the NC data generating unit 24 uses a 'tool angle' method, as later explained, in addition to the above mentioned four setting methods.

The control signal generator 25 of the controller 20 generates a control signal that drives the driving unit 30 of the complex machining device 1 based on NC data including those on tool orientation as set using any one of the above mentioned five setting methods by the NC data generating unit 24. The control signal generated is output to the driving unit 30 of the complex machining device 1.

It is observed that the respective processing operations in the NC data generating unit 24 of the controller 20 may be executed by a program installed on the ROM 22 or the hard disc of the computer that forms the controller 20. Such program may be provided from a recording medium, e.g., a magnetic disc, an optical disc, a magneto-optical disc or a semiconductor memory, or distributed from an exterior information processing device over a network so as to be installed on the ROM 22 or the hard disc of the controller 20.

In the complex machining device 1 having the above mentioned configuration, NC data are generated in the NC data generating unit 24 based on the shape data and the machining condition data entered from the exterior device 40 to the controller 20, as described above. The NC data generated is output to the control signal generator 25. The control signal generator 25 in the complex machining device 1 then generates a control signal that drives the driving unit 30 based on the NC data entered from the NC data generating unit 24. The control signal generator 25 outputs the control signal generated to the driving unit 30 to drive it. In the complex machining device 1, a work is to be cut or machined as a turning tool 7 mounted on the turret 5a is driven along the X axis and/or the Z axis for turning. To this end, the work is mounted on the chuck 10a of the first main spindle 10 and/or on the chuck 11a of the second main spindle 11 for rotation in the C-direction about the Z axis. In addition, the milling tool 8 fastened on the third main spindle 6 is driven along the X axis direction, Y axis direction or along the Z axis direction, while being rotated in the B-direction, that is, about the Y axis direction, for milling.

The method for the NC data generating unit 24 of the controller 20 to set the tool orientation using the 'tool angle' method will now be explained with reference to the flowchart of FIG. 3. This 'tool angle' method is used for a case where a work having an elliptical cross-section 50 is caused to revolve through 360° to cut a blade, as shown in FIG. 4. Here, such a case is explained in which the work having an elliptical cross-section 50, mounted on the chuck 10a of the first main spindle 10, is caused to revolve through 360° in the C-direction, that is, about the Z axis, and is cut by the milling tool member 8, fastened on the third main spindle 6, for milling.

Figure 3:
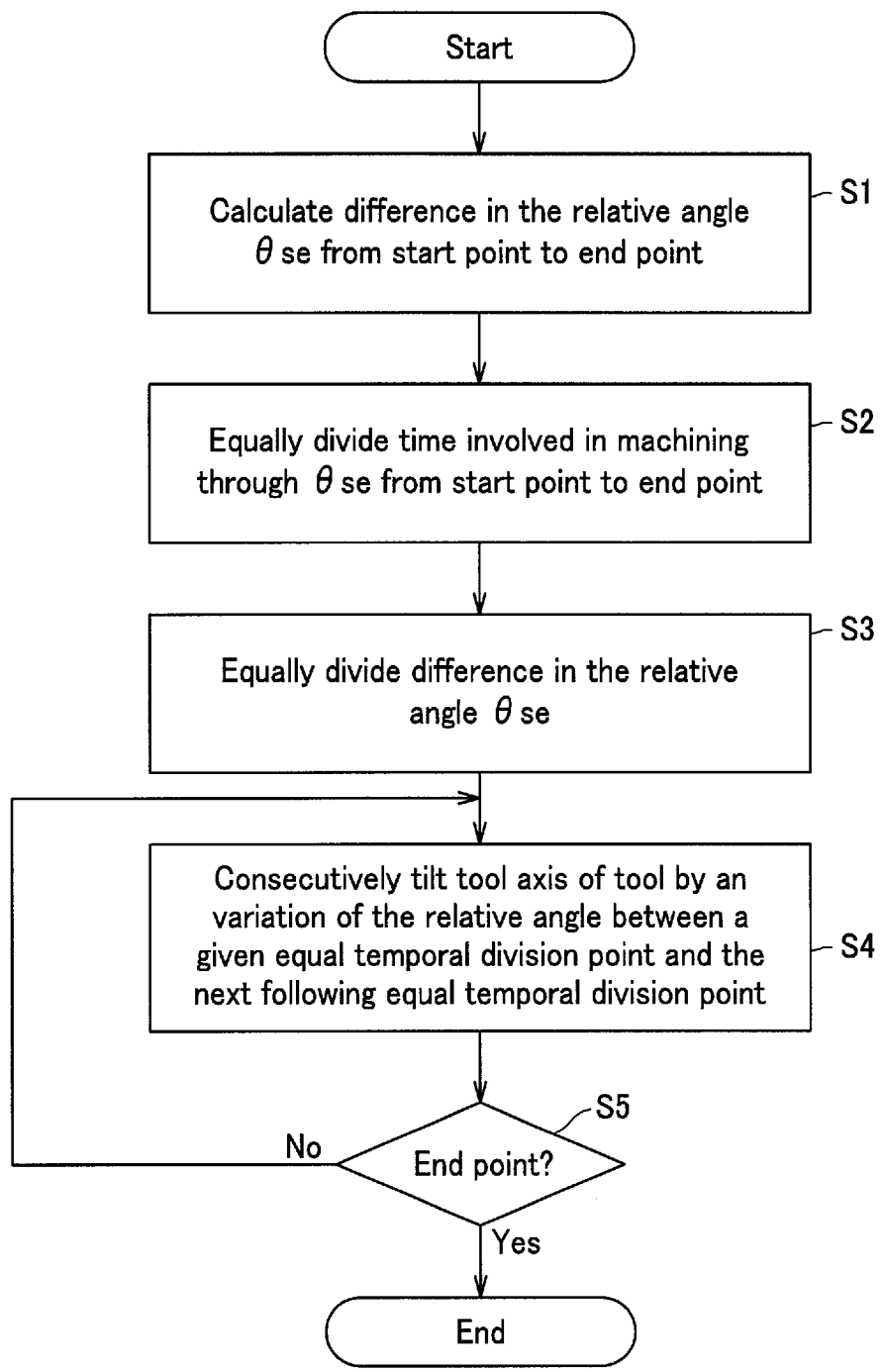
FIG. 3 is a flowchart showing the sequence of operations of setting tool orientation using a 'tool angle' method.
Figure 4:
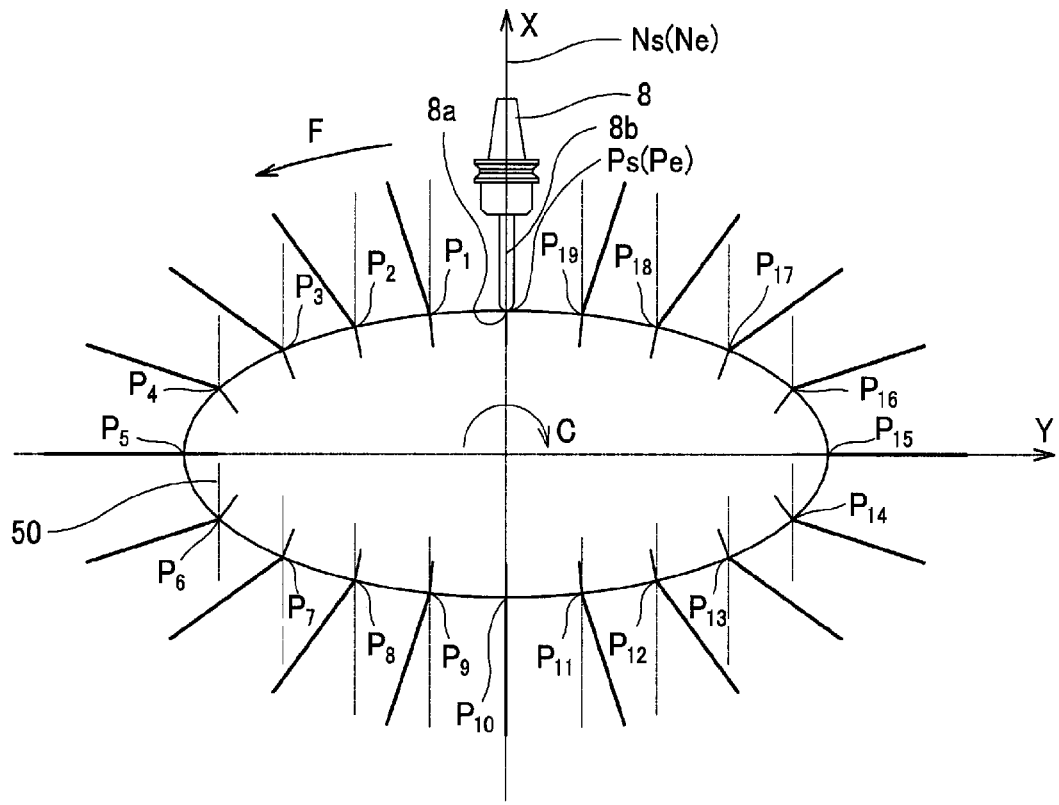
FIG. 4 is a cross-sectional view showing the orientation of a tool axis of a tool at a start point when the tool orientation is set using the 'tool angle' method.

In a step S1 of FIG. 3, the NC data generating unit 24 calculates a difference $\theta_{se}$ of the relative angle between the work 50 and the tool member 8, on a tool path formed on an outer rim of the work 50, as from a start point $P_s$ to an end point $P_e$ of the machining operation by the tool member 8. The difference $\theta_{se}$ herein means an angle through which the angle the tool axis 8b of the tool member 8 makes with a normal line $N_e$ drawn to the surface of the work 50 at an end point $P_e$, also referred to below as an end point angle, has relatively changed along the feed direction F. Although here the start point angle is 0° and the end point angle is also 0°, as shown in FIG. 4, the tool member 8 has actually rotated through 360° along the outer rim of the work 50, so that the difference $\theta_{se}$ of the relative angle is 360°.

Next, in a step S2, the NC data generating unit 24 equally distributes the time needed in machining along the tool path from the start point $P_s$ to the end point $P_e$ along the tool path. That is, the NC data generating unit equally divides the time needed in machining from the start point $P_s$ to the end point $P_e$ with an optional number to give a plural number of equal time divisions. The positions on the tool path corresponding to the equal time divisions are set as the equal time division tool path points so that the time needed for machining from one time point tool path point to the next will be equal throughout the length of the entire tool path. Here, the time needed for machining is divided into 20 equal parts, and 20 equal time division tool path point $P_s$, $P_1$, ..., $P_{19}$, $P_{20}$ are set.

Then, in a step S3, the NC data generator 24 equally divides the difference $\theta_{se}$ of the relative angle by a number equal to the above mentioned preset number. That is, since the difference of the relative angle $\theta_{se}$ is here 360°, it is divided into equal parts (variations of the relative angle) of 18°, each of which corresponds to each equal time division tool path point on the tool path.

Next, in a step S4, the NC data generating unit 24 rotationally drives the work 50 in the C-direction in FIG. 4, at the same time as it drives the tool member 8 at a command rate of feed for cutting in the feed direction F as shown in FIG. 4. Thus, a foremost part 8a of the tool member 8 travels through the equal time division tool path points $P_s$, $P_1$, $P_2$, ..., $P_{18}$, $P_{19}$, $P_e$ in this order along the tool path. At this time, the NC data generating unit 24 causes the orientation of the foremost part 8a of the tool member 8 to be changed in succession by an angle equal to the above mentioned variation of the relative angle from one of the equal time division tool path points to the next.

Figure 5:
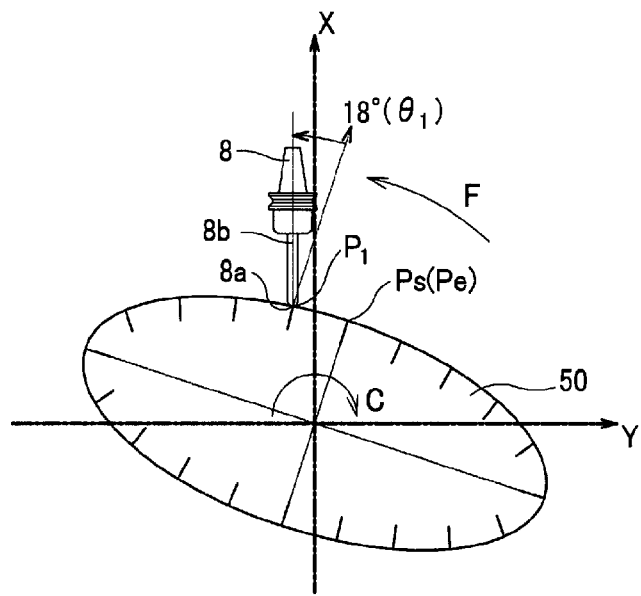
FIG. 5 is a cross-sectional view showing the orientation of a tool axis at a first equal time division tool path point when the tool orientation is set using the 'tool angle' method.
Figure 6:
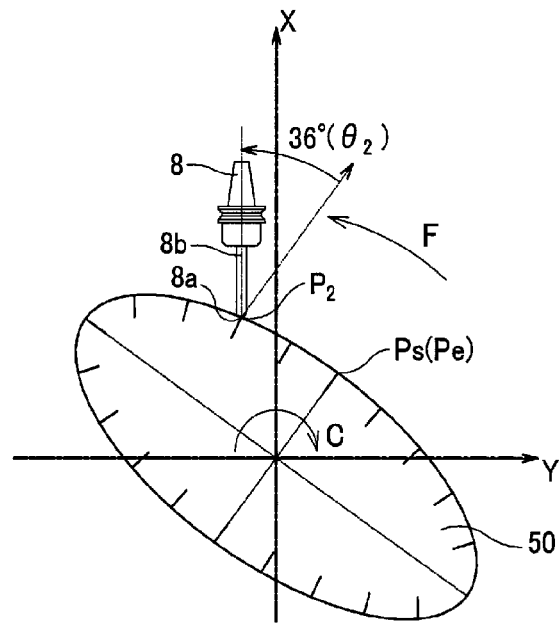
FIG. 6 is a cross-sectional view showing the orientation of the tool axis at a second equal time division tool path point when the tool orientation is set using the 'tool angle' method.

More specifically, the NC data generating unit 24 continuously tilts the tool axis 8b of the tool member 8 along the feed direction F, from the start point $P_s$ to the first equal time division tool path point $P_1$. Thus, at the first equal time division tool path point $P_1$, the tool axis $8b$ is tilted by the variation in the relative angle of 18° ($\theta_1$) in the feed direction F from the start point angle, as shown in FIG. 5. Then, the NC data generating unit 24 continuously tilts the tool axis $8b$ of the tool member 8 along the feed direction F, from the first equal time division tool path point $P_1$ to the second equal time division tool path point $P_2$, as shown in FIG. 6. As a result, at the second equal time division tool path point $P_2$, the tool axis $8b$ is tilted 18° in the feed direction F from the tilt ($\theta_1$) at the first equal time division tool path point $P_1$, so that the tool axis is tilted 36° ($\theta_2$) in the feed direction F from the start point tilt.

Figure 7:
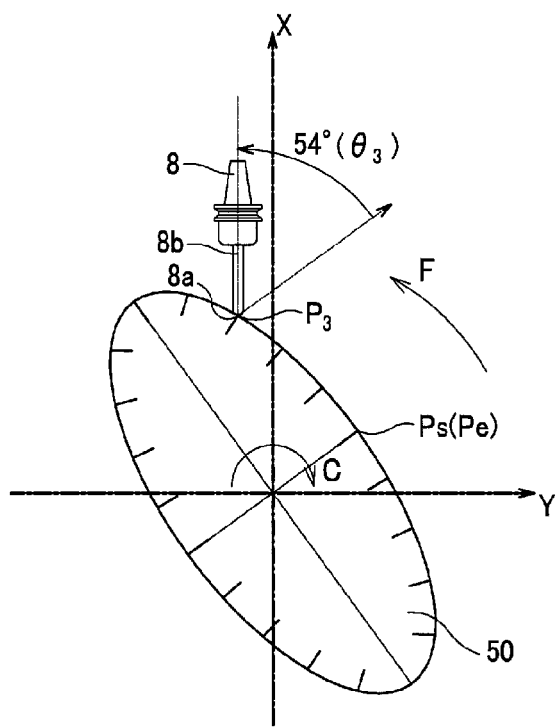
FIG. 7 is a cross-sectional view showing the orientation of the tool axis at a third equal time division tool path point when the tool orientation is set using the 'tool angle' method.
Figure 8:
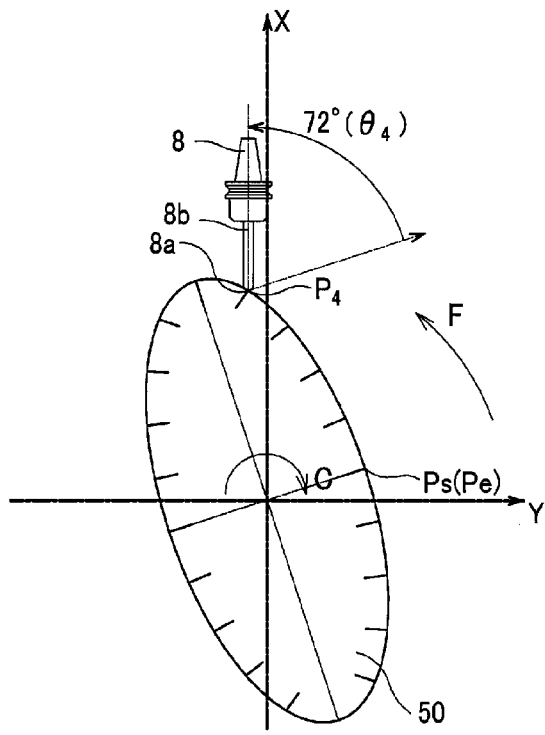
FIG. 8 is a cross-sectional view showing the orientation of the tool axis at a fourth equal time division tool path point when the tool orientation is set using the 'tool angle' method.

The NC data generating unit 24 continuously tilts the tool axis $8b$ of the tool member 8 along the feed direction F, from the second equal time division tool path point $P_2$ to the third equal time division tool path point $P_3$, as shown in FIG. 7. Thus, at the third equal time division tool path point $P_3$, the tool axis $8b$ is tilted 18° in the feed direction F from the second equal time division tool path point $P_2$ ($\theta_2$), so that the tool axis is tilted 54° ($\theta_3$) in the feed direction F from the start point tilt, as shown in FIG. 7. Then, the NC data generating unit 24 continuously tilts the tool axis $8b$ of the tool member 8 along the feed direction F, from the third equal time division tool path point $P_3$ to the fourth equal time division tool path point $P_4$. Thus, at the fourth equal time division tool path point $P_4$, the tool axis $8b$ is tilted 18° in the feed direction F from the tilt ($\theta_3$) at the third equal time division tool path point $P_3$, so that the tool axis is tilted 72° ($\theta_4$) in the feed direction F from the start point tilt, as shown in FIG. 8.

Figure 9:
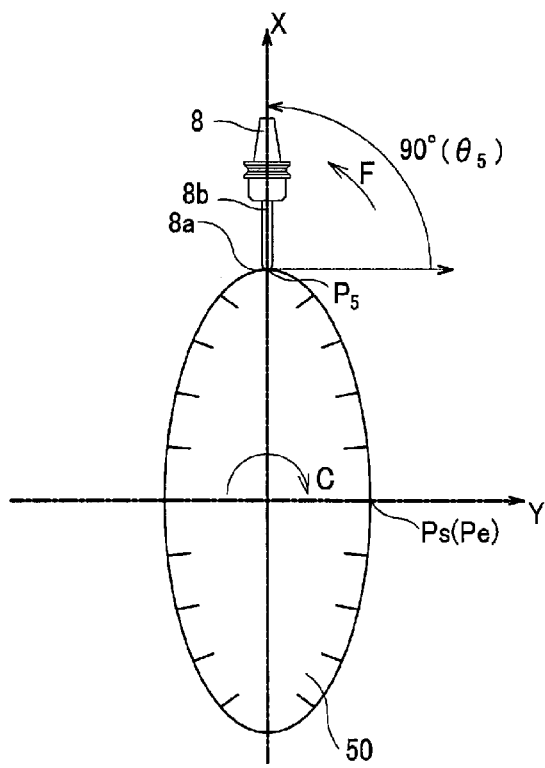
FIG. 9 is a cross-sectional view showing the orientation of the tool axis at a fifth equal time division tool path point when the tool orientation is set using the 'tool angle' method.
Figure 10:
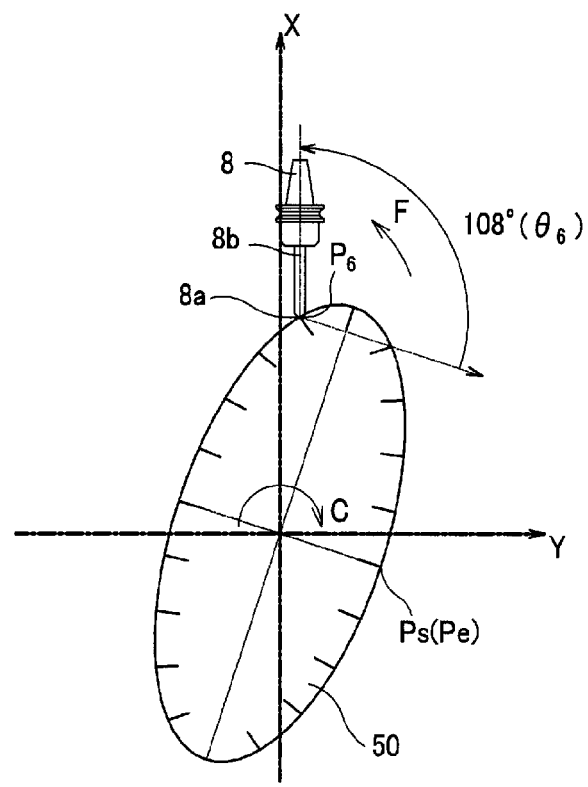
FIG. 10 is a cross-sectional view showing the orientation of the tool axis at a sixth equal time division tool path point when the tool orientation is set using the 'tool angle' method.

The NC data generating unit 24 continuously tilts the tool axis $8b$ of the tool member 8 along the feed direction F, from the fourth equal time division tool path point $P_4$ to the fifth equal time division tool path point $P_5$. Thus, at the fifth equal time division tool path point $P_5$, the tool axis $8b$ is tilted 18° in the feed direction F from the fourth equal time division tool path point $P_4$ ($\theta_4$), so that the tool axis is tilted 90° ($\theta_5$) in the feed direction F from the start point tilt, as shown in FIG. 9. The NC data generating unit 24 then continuously tilts the tool axis $8b$ of the tool member 8 along the feed direction F, from the fifth equal time division tool path point $P_5$ to the sixth equal time division tool path point P6. Thus, at the sixth equal time division tool path point P6, the tool axis $8b$ is tilted 18° in the feed direction F from the tilt ($\theta_5$) at the fifth equal time division tool path point $P_5$, so that the tool axis is tilted 108° ($\theta_6$) in the feed direction F from the start point tilt, as shown in FIG. 10.

Figure 11:
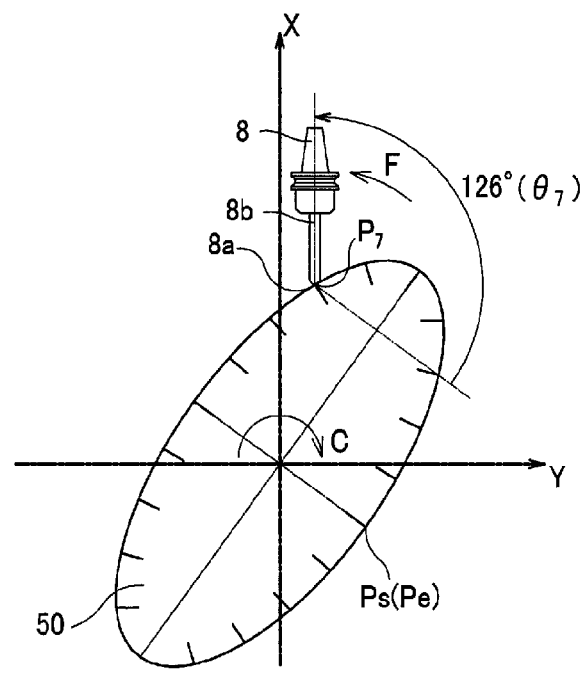
FIG. 11 is a cross-sectional view showing the orientation of the tool axis at a seventh equal time division tool path point when the tool orientation is set using the 'tool angle' method.
Figure 12:
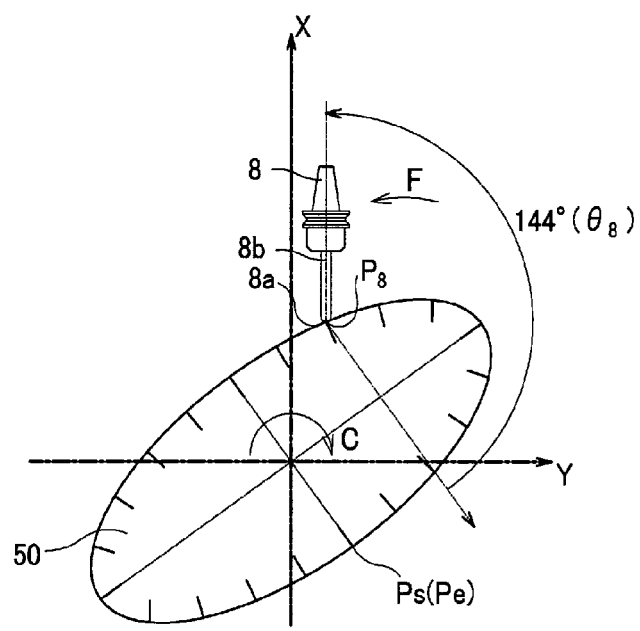
FIG. 12 is a cross-sectional view showing the orientation of the tool axis at eighth equal time division tool path point when the tool orientation is set using the 'tool angle' method.

The NC data generating unit 24 continuously tilts the tool axis $8b$ of the tool member 8 along the feed direction F, from the sixth equal time division tool path point $P_6$ to the seventh equal time division tool path point $P_7$. Thus, at the seventh equal time division tool path point $P_7$, the tool axis $8b$ is tilted 18° in the feed direction from the sixth equal time division tool path point $P_6$ ($\theta_6$), so that the tool axis is tilted 126° ($\theta_7$) in the feed direction from the start point tilt, as shown in FIG. 11. Then, the NC data generating unit 24 continuously tilts the tool axis $8b$ of the tool member 8 along the feed direction F from the seventh equal time division tool path point $P_7$ to the eighth equal time division tool path point $P_8$. Thus, at the eighth equal time division tool path point $P_8$, the tool axis $8b$ is tilted 18° in the feed direction from the tilt ($\theta_7$) at the seventh equal time division tool path point $P_7$, so that the tool axis is tilted 144° ($\theta_8$) in the feed direction from the start point tilt, as shown in FIG. 12.

Figure 13:
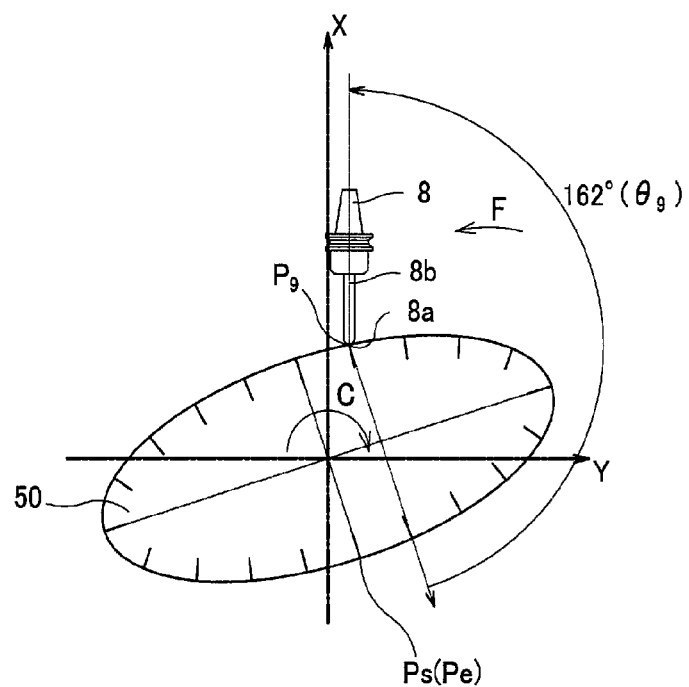
FIG. 13 is a cross-sectional view showing the orientation of the tool axis at a ninth equal time division tool path point when the tool orientation is set using the 'tool angle' method.
Figure 14:
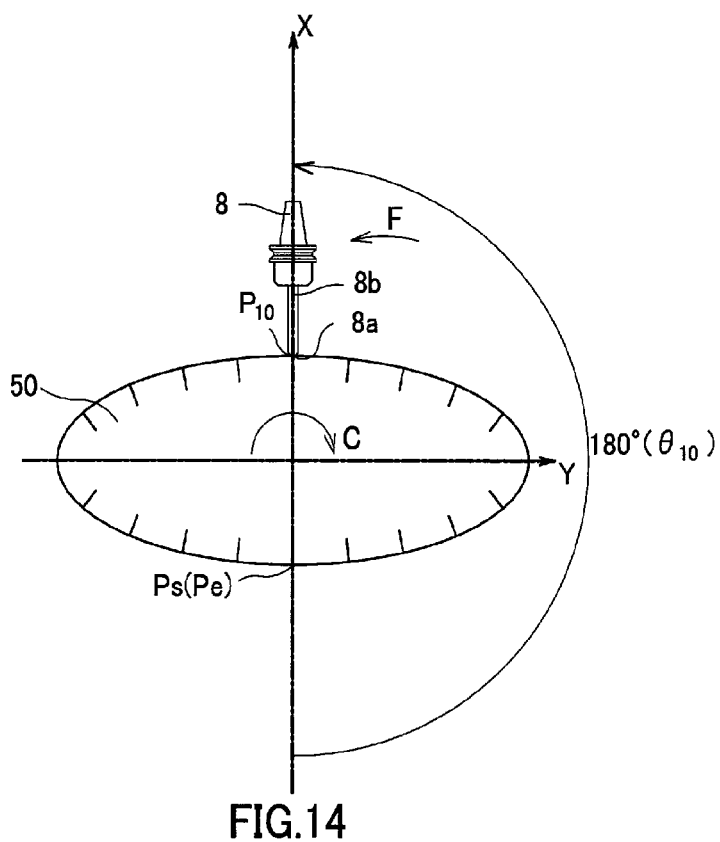
FIG. 14 is a cross-sectional view showing the orientation of the tool axis at a tenth equal time division tool path point when the tool orientation is set using the 'tool angle' method.
Figure 15:
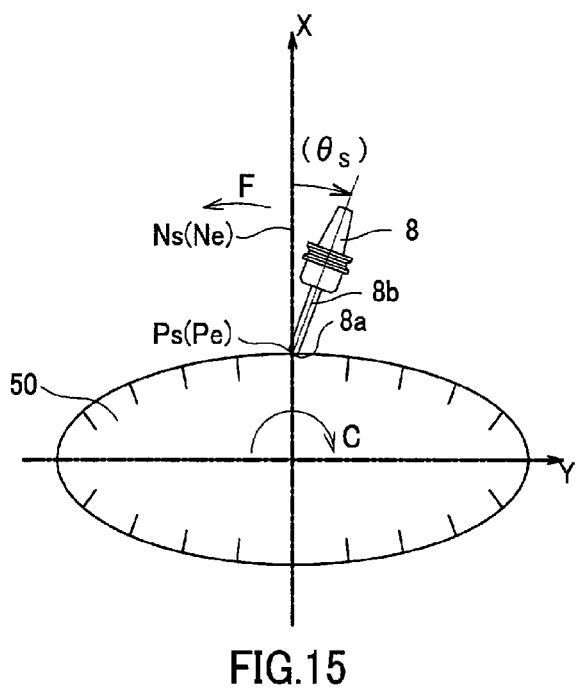
FIG. 15 is a cross-sectional view showing a modification of tool orientation of a tool axis in setting the tool orientation using the 'tool angle' method.
Figure 16:
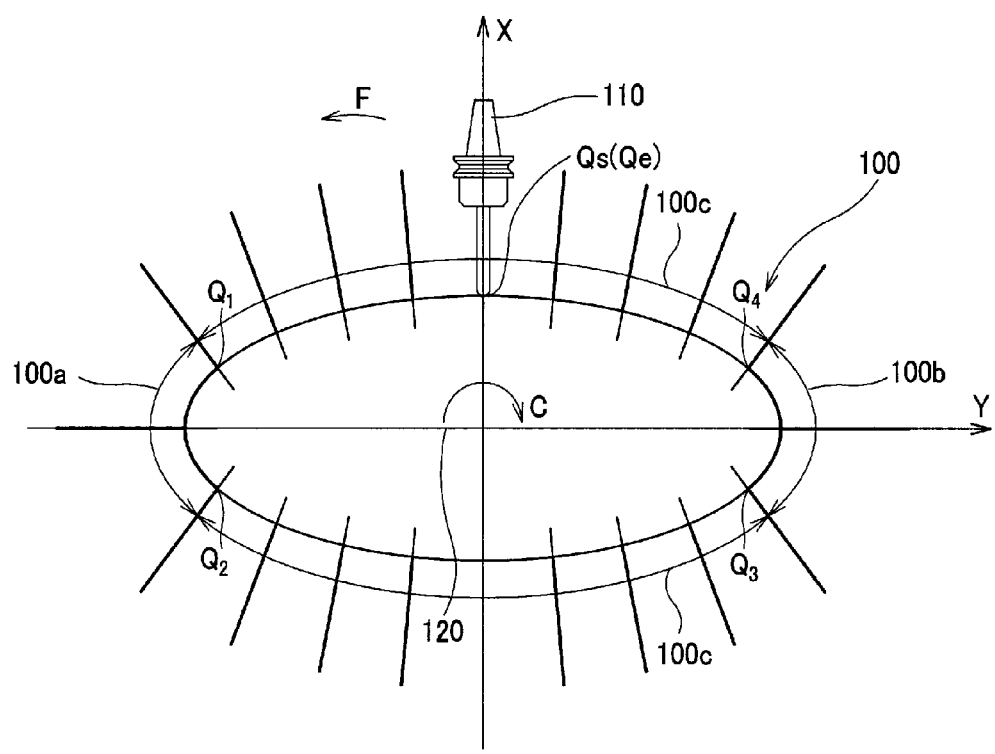
FIG. 16 is a cross-sectional view showing the tool orientation of the tool axis at a start point when the tool orientation is set using the 'surface square or angular' method.

The NC data generating unit 24 continuously tilts the tool axis $8b$ of the tool member 8 along the feed direction F, from the eighth equal time division tool path point $P_8$ to the ninth equal time division tool path point $P_9$, as shown in FIG. 13. Thus, at the ninth equal time division tool path point $P_9$, the tool axis $8b$ is tilted 18° in the feed direction from the eighth equal time division tool path point $P_8$ ($\theta_8$), so that the tool axis is tilted 162° ($\theta_9$) in the feed direction from the start point tilt, as shown in FIG. 13. Then, the NC data generating unit 24 continuously tilts the tool axis $8b$ of the tool member 8 along the feed direction F from the ninth equal time division tool path point $P_9$ to the tenth equal time division tool path point $P_{10}$. Thus, at the tenth equal time division tool path point $P_{10}$, the tool axis $8b$ is tilted 18° in the feed direction F from the tilt ($\theta_9$) at the ninth equal time division tool path point $P_9$, so that the tool axis is tilted 180° ($\theta_{10}$) in the feed direction from the start point tilt, as shown in FIG. 14.

In a step S5, the NC data generating unit 24 continuously tilts the tool axis $8b$ of the tool member 8 along the feed direction from the eleventh equal time division tool path point $P_{11}$ to the end point $P_e$, in the same manner as from the first equal time division tool path point $P_1$ to the tenth equal time division tool path point $P_{10}$. Specifically, the NC data generating device tilts the tool axis $8b$ by 18° in the feed direction from the tilt at each directly previous equal time division tool path point. Thus, at the end point $P_e$ corresponding to the 20th equal time division tool path point, the tool is tilted 360° from the tool tilt at the start point $P_s$.

The NC data generating unit 24 thus sets the tool orientation of the tool member 8 using the 'tool angle' method. By so doing, even in case of causing the work having an elliptical cross-section 50 to be revolved 360° to produce a blade, it is possible to render changes in the orientation of the tool member 8 uniform to provide for a constant angular velocity of tilt of the tool member 8 attendant on changes in orientation of the tool member 8. Thus, in machining the work having an elliptical cross-section 50 along a preset path, as conventionally, it is possible, with the use of the NC data generating unit 24, to maintain a constant machining feed rate from the start point $P_s$ until the end point $P_e$ of the machining operation on the tool path. It may be seen that, during the time of machining, there is no risk that tool orientation is rapidly changed on a certain site on the tool path such that the rate of feed for cutting is lowered on such site. Thus, in the complex machining device 1 according to the present invention, the machining time may be reduced in comparison to the case of using the conventional technique to improve surface properties of products obtained on machining.

Moreover, with the use of the NC data generating unit 24, the tool orientation may be the same at the start point $P_s$ as at the end point $P_e$ even after the work has been rotated through 360° to perform one complete revolution. It is thus possible with the complex machining device 1 to perform continuous blade machining.

In the NC data generating unit 24, the tool member 8 may be tilted a preset angle along the Z axis direction, which is orthogonal to the feed direction F, in case the tool axis $8b$ of the tool member 8 is coincident with the line normal to the surface of the work 50 at each of the start point $P_s$, fifth equal time division tool path point $P_5$, tenth equal time division tool path point $P_{10}$, the 15th equal time division tool path point $P_{15}$, and the end point $P_e$. The finished product may then be improved in surface properties.

In case changes in the tool orientation are uniform between neighboring equal time division tool path points on an average, with the angular velocity of tilt of the tool member 8 being constant, the NC data generating unit 24 may be so set that changes in the tool orientation will be non-uniform within an area defined between the equal time division tool path points, neighboring to each other, with the angular velocity of tilt of the tool member 8 being variable. Even in such case, since the changes in the tool orientation are uniform and the angular rate of the tilt of the tool member 8 remains constant, between the equal time division tool path points, the rate of feed for cutting may be kept constant, thus allowing reducing the machining time to improve surface properties of the finished product.

In the 'tool angle' method, the case where both the start point angle and the end point angle are zero has been taken up only for explanation and not for restricting the present invention. That is, the start point angle at the start point $P_s$ and the end point angle at the end point $P_e$, specifically, the angle the tool axis 8b of the tool member 8 makes with the line Ns normal to the surface of the work 50 at the start point $P_s$ and the angle the tool axis 8b of the tool member 8 makes with the line $N_e$ normal to the surface of the work 50 at the start point $P_e$, may be inclined at a preset angle θs relative to the feed direction F.

In this case, the NC data generating unit 24 continuously tilts the tool axis 8b of the tool member 8 along the feed direction F from the start point $P_s$ up to the first equal time division tool path point $P_1$, so that, at the first equal time division tool path point $P_1$, the tool axis is tilted 18° from the start point angle $θ_s$ along the feed direction F. The NC data generating unit 24 then causes the tool axis 8b of the tool member 8 to be tilted continuously along the feed direction F from the first equal time division tool path point $P_1$ up to the second equal time division tool path point $P_2$, so that, at the second equal time division tool path point $P_2$, the tool axis is tilted 36° from the start point angle $θ_s$ along the feed direction F. From the third equal time division tool path point $P_3$ up to the end point $P_e$, the tool axis is continuously tilted along the feed direction F, so that, at each subsequent equal time division tool path point, the tool axis is tilted 18° along the feed direction from the tilt at the directly previous equal time division tool path point. At the end point $P_e$ corresponding to the 20th equal time division tool path point, the tool axis is tilted 360° from the tool tilt at the start point $P_s$, with the end point angle being $θ_s$.

There may be cases wherein, in case the start point angle and the end point angle are tilted by the angle $θ_s$, the tool axis 8b of the tool member 8 coincides with the direction of a line normal to the surface of the work 50 at one of the optional equal time division tool path point. In such case, the NC data generating unit 24 may be designed so that the tool axis 8b of the tool member 8 will be inclined a preset angle relative to the Z axis direction normal to the feed direction F. By so doing, the finished product may be improved in its surface properties.

The NC data generating unit 24 is not limited to a configuration of dividing the time for machining from the start point $P_s$ to the end point $P_e$ into 20 equal time divisions to each of which an angular increment of 18° is assigned. It is thus possible to divide the time for machining into an optional number of equal parts, to each of which a corresponding angular increment may be assigned, provided that the angular increment is within an angle that allows for machining with the tool member 8 used for carrying out the machining operation.

The 'tool angle' method is not limited to the case of machining the work having an elliptical cross-section 50. For example, it may be used for machining an ellipsoidal curved surface of a work having a non-circular cross-section, provided that the work has such ellipsoidal curved surface in its outer peripheral portion. In such case, the NC data generating unit 24 may set an end of the ellipsoidal curved surface as a start point $P_s$, while setting its other end as an end point $P_e$.

The above mentioned 'tool angle' method may be used to set the tool orientation to provide for a constant angular velocity of the tilting of the tool member 8 to keep the feed rate of cutting constant.

The 'tool angle' method may be applied even in case there is an obstacle, such as protuberance, on an ellipsoidal curved surface of the work, with the ellipsoidal curved surface of the work existing on part or all of its outer periphery, and with the tool cutting the ellipsoidal curved surface of the work 50 having at the obstacle an angular portion whose angle is outside the value that allows for machining. In such case, the machining operation may be carried out as follows: The NC data generating unit 24 sets the start point $P_s$ at one end of the ellipsoidal curved surface, while setting the end point $P_e$ at one end of the obstacle lying towards the start point $P_s$. The above mentioned 'tool angle' method is used to set the tool orientation. The NC data generating device then sets a new start point $P_s'$ at the other end of the obstacle, while setting the other end of the ellipsoidal curved surface as a new end point $P_e'$. The 'tool angle' method is then used to set the tool orientation. In this manner, the angular velocity of the tilting of the tool member 8 may be made constant in an area other than the site of the obstacle to keep the feed rate of cutting constant. The number of equal time division tool path points between the start point $P_s$ and the end point $P_e$ and the variation of the relative angle may be made to differ from those for the new start point $P_s'$ and the new end point $P_e'$.

In the complex machining device 1, the NC data generating unit 24 is built into the controller 20. The NC data generating unit 24 may, however, be provided in a separate computer provided independently of the complex machining device 1. The separate independent computer operates as a CAM device and becomes an NC data generating device. The processing operations to be performed by the NC data generating unit 24 of the separate independent computer are performed in accordance with a program installed in a ROM or a hard disc of the computer. The program may be provided from recording mediums, such as magnetic disc, optical disc, magneto-optical disc or a semiconductor memory, or from an exterior information processing device over a network and installed on the ROM or the hard disc of the computer.

When the shape data and the machining condition data from the exterior device 40, operating as the CAD device, are delivered to the separate independent computer, the NC data generating unit 24 generates NC data in the same way as when the NC data generating device is built into the controller 20. The so generated NC data are output to the controller 20 of the complex machining device 1. The control signal generator 25 of the controller 20 of the complex machining device 1 generates a control signal driving the driving unit 30 of the complex machining device 1, based on the input NC data, and outputs the so generated control signal to the driving unit 30 of the complex machining device 1. It is thus possible for the complex machining device 1 to set the tool orientation using the 'tool angle' method to cut the work having an elliptical cross-section 50 into a blade by way of performing milling.

The machine tool according to the present invention is not limited to a complex machining device and may also be a 5-axis controlled machining center which is a conventional machining center added by two rotation axes. For example, the 5-axis controlled machining center may include, as a basic unit, a vertical machining center provided with a main spindle and a table. The main spindle may be driven along an X-axis, a Y axis and a Z axis that are perpendicular relative to one another, and may be fitted with a tool for milling in the Z axis direction. The table, on which a work may be mounted, may revolve in a direction in the B-direction about the Y axis and in the C-direction about the Z axis. In such 5-axis controlled machining center, the table fitted with the work thereon revolves by 90° in the B-axis direction about the Y axis, while the work revolves in the C-direction about the Z axis. The orientation of the tool is set, using the 'tool angle' method, in the same way as in the complex machining device 1. The work is cut to a blade, as the work having an elliptical cross-section 50 is caused to revolve, using a tool, such as an end mill, mounted on the main spindle, by way of performing the milling.

It should be understood by those skilled in the art that various modifications, combinations and alterations may occur depending on design requirements and other factors insofar as they are within the scope of the appended claims or the equivalents thereof.

What is claimed is:

1. A machine tool for machining a work having a non-circular cross-section by relative movement between the work and a tool, as the relative position and the relative angle between the work and the tool are changed at least within a plane including the cross-section of the work, wherein,
   in machining the work along a preset tool path on the work with the tool, the difference between the relative angle between the work and the tool at a point on the preset tool path at which the machining by the tool is started and that between the work and the tool at another point on the preset tool path at which the machining is finished is calculated;
   the time needed in the machining along the preset tool path is equally divided by a preset number to give the preset number of equal time divisions and positions on the tool path corresponding to the equal time divisions are set as equal time division tool path points; and wherein,
   when the tool moves through each of the equal time division tool path points, the relative angle between the tool and the work is continuously changed an angle corresponding to division of the difference between the relative angles by the preset number of the equal time divisions.

2. A method for machining a work having a non-circular cross-section by relative movement between the work and a tool, as the relative position and the relative angle between the work and the tool are changed at least within a plane including the non-circular cross-section of the work; the method comprising:
   calculating, in machining the work along a preset tool path on the work with the tool, the difference between the relative angle between the work and the tool at a point on the preset tool path at which the machining by the tool is started and that between the work and the tool at another point on the preset tool path at which the machining is finished;
   equally dividing the time needed in the machining along the preset tool path by a preset number to give the preset number of equal time divisions, and setting positions on the tool path corresponding to the equal time divisions as equal time division tool path points; and
   continuously changing, when the tool travels through each of the equal time division tool path points on the tool path corresponding to the equal time divisions, the relative angle between the tool and the work an angle corresponding to division of the difference of the relative angles by the above mentioned preset number.

3. A program stored in a medium for allowing a computer to execute a method for machining a work having a non-circular cross-section by relative movement between the work and a tool, as the relative position and the relative angle between the work and the tool are changed at least within a plane including the cross-section of the work; the method comprising:
   calculating, in machining the work along a preset tool path on the work with the tool, the difference between the relative angle between the work and the tool at a point on the preset tool path at which the machining by the tool is started and that between the work and the tool at another point on the preset tool path at which the machining is finished;
   equally dividing the time needed in the machining along the preset tool path by a preset number to give the preset number of equal time divisions, and setting positions on the tool path corresponding to the equal time divisions as equal time division tool path points; and
   continuously changing, when the tool travels through each of the equal time division tool path points on the tool path corresponding to the equal time divisions, the relative angle between the tool and the work an angle corresponding to division of the difference of the relative angles by the above mentioned preset number.

4. An NC data generation device that generates NC data that control a machine tool, the machine tool performing machining on a work with a non-circular cross-section, by relative movement between the work and a tool, as the relative position and the relative angle between the work and the tool are changed at least within a plane including the cross-section of the work;
   the NC data in machining the work on a preset path on the work allowing for calculating the difference between the relative angle between the work and the tool at a point on the preset tool path at which the machining by the tool is started and that between the work and the tool at another point on the preset tool path at which the machining is finished;
   the NC data allowing the time needed in the machining along the preset tool path to be equally divided at a preset number of equal time division points;
   the NC data allowing setting positions on the tool path corresponding to the equal time divisions as equal time division tool path points
   the NC data also allowing continuously changing, when the tool travels through each of the equal time division tool path points on the tool path corresponding to the equal time divisions, the relative angle between the tool and the work an angle corresponding to division of the difference of the relative angles by the above mentioned preset number.

* * * * *